United States Patent
Kraft et al.

(10) Patent No.: US 6,938,068 B1
(45) Date of Patent: Aug. 30, 2005

(54) SYSTEM FOR MANAGING AN EXCHANGE OF QUESTIONS AND ANSWERS THROUGH AN EXPERT ANSWER WEB SITE

(75) Inventors: Reiner Kraft, Gilroy, CA (US); Joann Ruvolo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 788 days.

(21) Appl. No.: 09/607,289

(22) Filed: Jun. 30, 2000

(51) Int. Cl.$^7$ .............................................. G06F 15/16
(52) U.S. Cl. ...................... 709/203; 709/225; 709/206; 709/203; 709/204
(58) Field of Search .............................. 709/225, 203, 709/206; 705/8, 10

(56) References Cited

U.S. PATENT DOCUMENTS

| | | | |
|---|---|---|---|
| 5,948,054 A | * | 9/1999 | Nielsen ...................... 709/200 |
| 6,026,148 A | * | 2/2000 | Dworkin et al. ......... 379/88.18 |
| 6,026,396 A | * | 2/2000 | Hall .............................. 707/4 |
| 6,064,978 A | * | 5/2000 | Gardner et al. ............... 705/10 |
| 6,195,654 B1 | * | 2/2001 | Wachtel ......................... 707/3 |
| 6,222,919 B1 | * | 4/2001 | Hollatz et al. ......... 379/265.12 |
| 6,394,899 B1 | * | 5/2002 | Walker .......................... 463/9 |
| 6,505,166 B1 | * | 1/2003 | Stephanou ..................... 705/8 |
| 6,829,585 B1 | * | 12/2004 | Grewal et al. ................. 705/8 |

OTHER PUBLICATIONS http://www.expertsexchange.com.
http://www.askme.com.

* cited by examiner

*Primary Examiner*—Zarni Maung
*Assistant Examiner*—Sahera Halim
(74) *Attorney, Agent, or Firm*—Jon A. Gibbons; Fleit, Kain, Gibbons, Gutman, Bongini & Bianco P.L.

(57) ABSTRACT

A question management system for an expert advice web site maintains a database of experts in different subject matter categories. Ranking scores associated with each expert are continually updated based on the timeliness of answers provided by the experts and answer rating feedback received from the question poser. According to another aspect of the invention, method and computer readable medium is disclosed for carrying out the above method.

34 Claims, 14 Drawing Sheets

SLIDING WINDOW MANAGER
(EXPERT CANCELS)

FIG. 11  RANKING MANAGER (LATE)

SLIDING WINDOW MANAGER
(EXPERT INDICATES TIME WAS TOO SHORT)

US 6,938,068 B1

SYSTEM FOR MANAGING AN EXCHANGE OF QUESTIONS AND ANSWERS THROUGH AN EXPERT ANSWER WEB SITE

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

CROSS-REFERENCE TO RELATED APPLICATIONS

Not Applicable

FIELD OF THE INVENTION

This invention pertains to a system and method for operating a web site through which users can obtain answers from experts.

BACKGROUND OF THE INVENTION

The Internet has greatly increased the level of communication in society. People have obtained through the Internet in the last few years ready access to a quantity and variety of information not dreamed of merely 10 years ago.

The Usenet provides several thousand news groups through which people may exchange ideas with others who have a common interest in the topic of the particular news group. People often seek to have questions answered by posting questions on a news group concerned with the general subject of the question. Numerous news groups relate to technical topics, such as computer hardware or software. Unfortunately, there is no assurance of quality of the answers received. The person posing the question is unlikely to have specific knowledge of the credentials of the persons supplying the answers. Also, news group are, unfortunately, often plagued by loquacious types who having limited knowledge of the topic are more than eager to offer information of dubious veracity. Often discussions disintegrate into antagonistic banter.

In connection with news groups there is also the issue of timing. The lifetime of a question posted to a news group may vary for different users (potential readers and answer providers) depending on the policy of their Internet Service Provider (ISP) related to how long postings are kept on the news server. Thus if an expert who could provide a good answer to a question does not consistently check a particular news group, the question may be missed.

Expert answer web sites which provide a more controlled forum for posing questions and supplying answers have also been developed. Two such web sites are www.expertsexchange.com and www.askme.com. These sites allow a user to select a category under which to list a question. A would be answerer then peruses the questions listed under chosen categories for questions they believe are within their field of expertise. A user can also select a particular expert to pose a question to based on a few paragraphs describing the expert's area of expertise.

The two web sites suffer from the drawback that the matching up of questions and experts is dependant on the experts perusal of the current pending questions. The process of matching up questions and experts is not systematic. Another issue relates to the timeliness with which answers can be obtained. The subjects which dominate the two sites relate to technical computer matters. Computer development work is more often then not undertaken under circumstances of pressure to complete projects within a specified time in order for an enterprise to be competitive. A user may pose a question which is not seen until too late by an expert who only undertakes the time consuming process of perusing new questions every so often. Given the prevailing time consciousness that affects many users seeking advise through this type of web site, what is needed is a system that provides more timely delivery of answers.

What is further needed is a system and method for system that automatically identifies suitable experts for answering a question, and ascertains if they can answer the question.

What is needed is a system which takes into account the past performance of the experts, in determining whether to refer questions to them.

What is further needed is a system and method which generally overcomes the above mentioned shortcomings in prior art Internet information resources.

SUMMARY OF THE INVENTION

Briefly, a system for managing questions submitted by a question poser and answered by one or more experts comprise a question management server, a question poser communication interface, an expert communication interface, an expert ranking database (an expertise repository) for maintaining a list of experts in one or more categories along with an item of information indicative of one or more factors selected from a group consisting of timeliness of an expert in providing answers and quality of answers provided by an expert, and an expert set determinator for extracting a set of experts in a particular category from the expert ranking database, and, a sliding window manager for extracting a contiguous subset of the set of experts to whom to send a question received from a question poser.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE PREFERRED EMBODIMENTS

It should be understood that the embodiments presented are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

Exemplary Network

Figure 1:
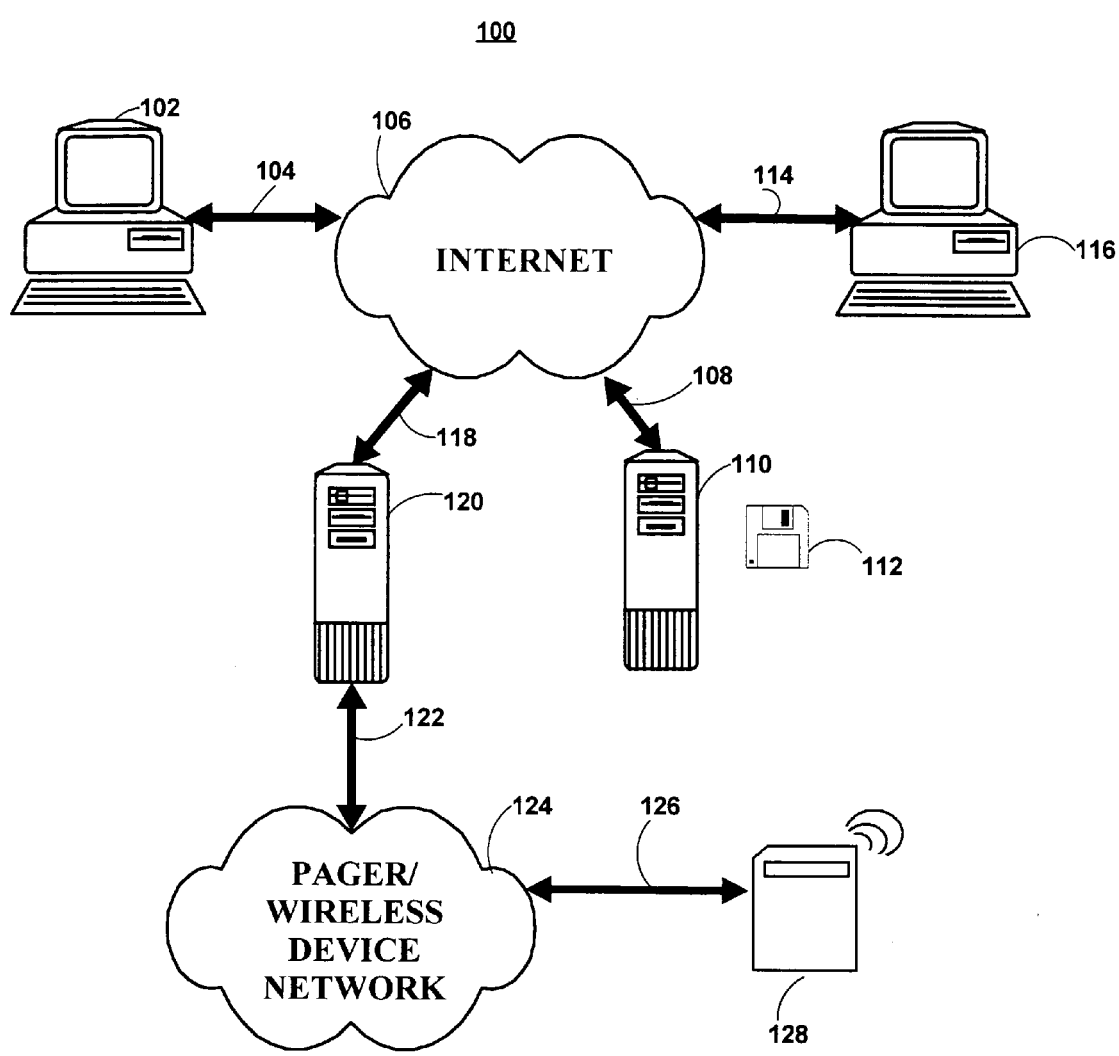
FIG. 1 is a schematic of a computer system used in practicing an embodiment of the invention.

Referring to FIG. 1, a schematic of a computer system 100 used in connection with an embodiment of the present invention is depicted. A question poser using a client computer 102 is connected to the Internet 106 through a first bidirectional data link 104. An expert using a client computer 116 is connected to the Internet 106 through a second bidirectional data link 114. Bidirectional data links 104, and 114 may for example takes the form of dial-up modem connections or Digital Subscriber line (DSL) connections. A question management server 110 is connected to the Internet through a third bidirectional data link 108, which may for example take to form of a T1 connection. A pager network gateway computer 120 is connected to the Internet through a fourth bidirectional data link 118. The pager network gateway computer 120 is connected through a fifth bidirectional data link 122 to a pager/wireless device network 124. The pager/wireless device network 124 is connected to a pager/wireless device 128 through a wireless data link 126. The pager/wireless device network 124 can be used to quickly send messages to experts through wireless devices 128 in their possession.

A removable memory medium 112 is provided for loading software onto the question management server 110 to configure it to carry out its question management function. The functioning of the question management server will be described below in more detail, with reference to a functional block diagram and flow diagrams shown in the FIGS.

Exemplary Functional Block Diagram of Various Software Components

Figure 2:
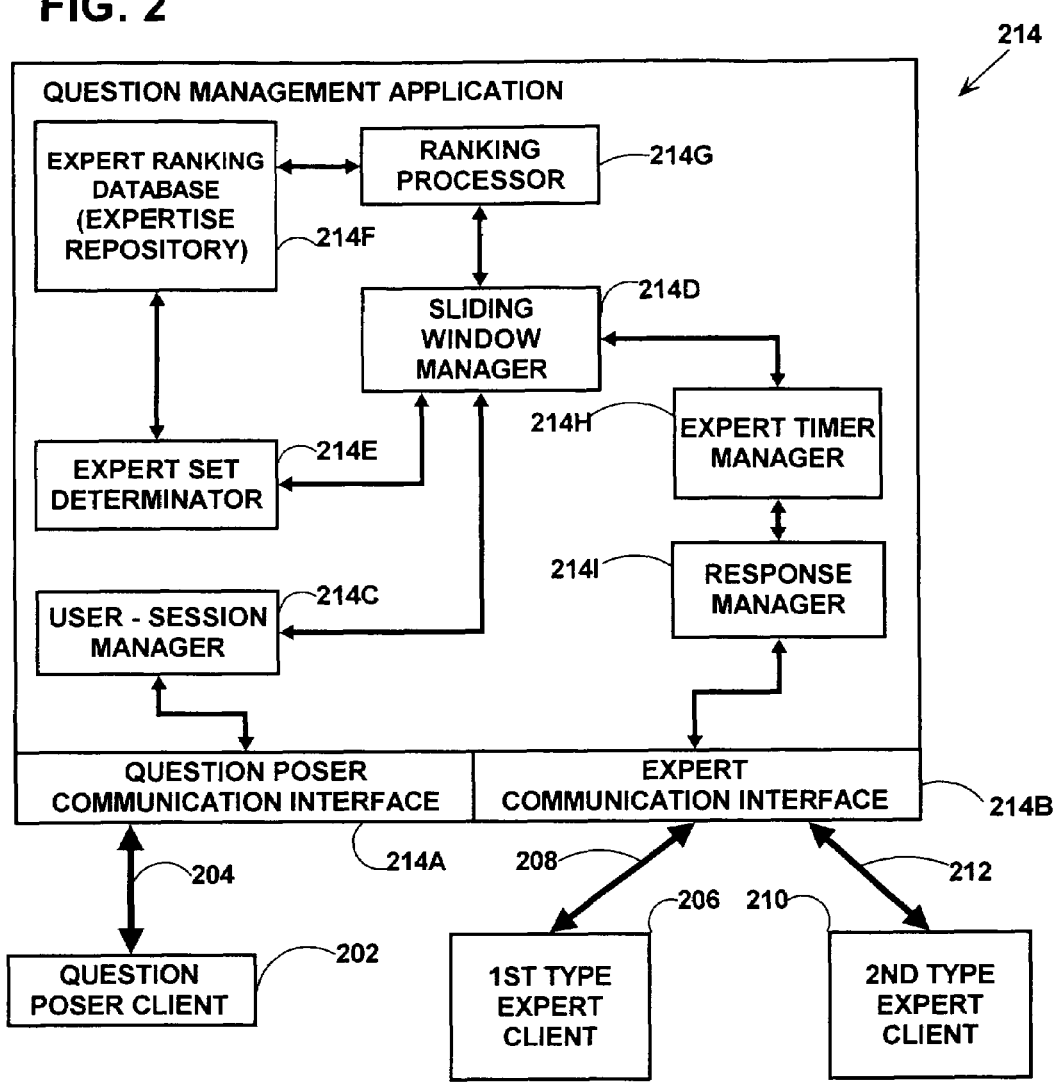
FIG. 2 is a representation of software interrelationship according to an embodiment of the invention.

In FIG. 2 a schematic 200 representing the interrelationship of software components according to a preferred embodiment of the invention is shown.

Referring to FIG. 2, a question poser client application 202 which may comprise a web browser or an email client is in communication with a question management server application 214 through a connection 204, and a question poser communication interface 214A. The connection 204, for example may comprise an Internet protocol (IP) connection, in which case the communication interface 214A, would comprise a communication protocol stack including IP as one layer. The question poser communication interface 214A may comprise a web server component and an email server component, both of which can send and receive information.

The web server component may comprise common gateway interface (CGI) scripts for processing input submitted by the user through web pages generated by the server component. For example selection of a subject category for a question, submission of the question, indication of a time by which the question should be answered, and at a later time submitting feedback on the quality of answers received maybe processed by a CGI script. Such CGI scripts may invoke program components, discussed below, which may be written in a programming language such as Java. The question poser communication interface could serve up web pages comprising forms, including form tags, the action attributes of which point to CGI scripts.

The question poser communication interface could also comprise an email component, which could be used to receive questions, and feedback from a question poser client 202 in the form of an email client, and to send answers to the question poser client 202.

A first expert client application 206 is connected to the question management application 214 through a connection 208, and an expert communication interface 214B. The first expert client application 206 could for example comprise a web browser which an expert uses to interface with the question management application 214. The expert communication interface 214B could comprise a web server which transmits one or more web pages and web forms to the first client 206, for the communicating with an expert. Web pages could be provided for reading new questions, and submitting answers or explicitly declining to answer questions.

A second type expert client application 210 is connected to the question management application 214, through connection 212 and expert communication interface 214B. According to one embodiment, the second type expert client application is the software used to operate a wireless device such as a text messaging pager 128. The wireless device provides the capability to send text messages to an expert. The text messages could be used to communicate questions and the time by which an answer is requested. Employing a text messaging pager provides the advantage of timely notification to experts of new questions. The connection 212 would be made through bidirectional data links 108, 118, 122, the Internet 106, the pager network gateway computer 120, the pager/wireless device network 124 and the data link 126.

Either the first or second type expert clients 206, 210 or a third expert client (not shown) could take the form of an email client which would allow experts to receive notification of new question and submit answers or other responses.

The question management application comprises a number of other internal components. Although the software arrangement presented herein with reference to FIG. 2 is presently contemplated by the inventors, and is also suitable for presenting a discussion of the various processes performed by the question management application, the invention should not be construed as limited to a particular software arrangement. The arrangement of the software of a system which falls within the scope of the claims is flexible.

Referring, once again to FIG. 2 the question management application comprises a number of further modules (classes in the paradigm of object oriented programming) which are designated 214X, where X is a letter: These modules will be briefly described presently with reference to FIG. 2. The processes they carry out will be discussed in more detail with reference to flow diagrams shown in the FIGS.

A user session manager 214C is responsible for managing communication with the question poser. In this capacity, it is responsible for, inter alia, receiving questions and ancillary information from question posers, sending answers back to the question posers, and reading feedback from question posers. The user session manger 214C is invoked by modules to perform these functions. The user session manager communicates through the question poser communication interface 214B.

An expert set determinator 214E is responsible for accessing an expert ranking (expertise repository) 214F to extract a list of experts in a category indicated by a question poser. The expert ranking database (expertise repository) 214F comprises a database of experts in differing categories, and one or more items of information indicative of the quality and timeliness of each expert's answers, the latter possibly being segregated by category in the case that an expert appears in multiple categories. A list of experts in a particular category may be sorted according to the one or more measures. Alternatively the sorting could be done by the expert set determinator 214E after reading the list of experts in a particular category or by the sliding window manager. The database 214F is generally speaking a data structure.

A sliding window manager 214D plays a central role managing other components. The sliding window manager 214D initially selects a contiguous sequence of experts from the top of a sorted version of the list of experts in the subject category of a new question and submits the question to them. If a selected expert time out without answering, declines to answer, or if they submit their answer and the question poser does not declare the question answered, then the sliding manager will select another expert from the next position in the sorted list and send the question the question to that expert. Thus, an important function performed by the sliding window manager 214D, is to insure that answers are received from a sufficient number of experts.

A ranking processor 214G is responsible for modifying a ranking score associated with each expert in the expert ranking database (expertise repository) 214F. The ranking score is an example of an item of information indicative of the timeliness and quality of answers received from the expert. The ranking score is a form of a precedence attribute for each expert which will be used to sort the experts in a particular subject category. The precedence attributes associated with a set of experts in a subject category determine which experts will be preferentially sent new questions.

An expert timer manager 214H is responsible for tracking the time taken by each expert to answer questions, and to alert the sliding window manager 214D if the expert exceeds a time limit. The time limit may be imposed by (received from) the question poser.

A response manager 214I is responsible for managing communication with experts. Among its functions is to receive messages through the expert communication interface 214B, to parse those answers and to pass the extracted information to the expert timer manager. Questions submitted to the experts are also passed through the response manager.

Figure 3:
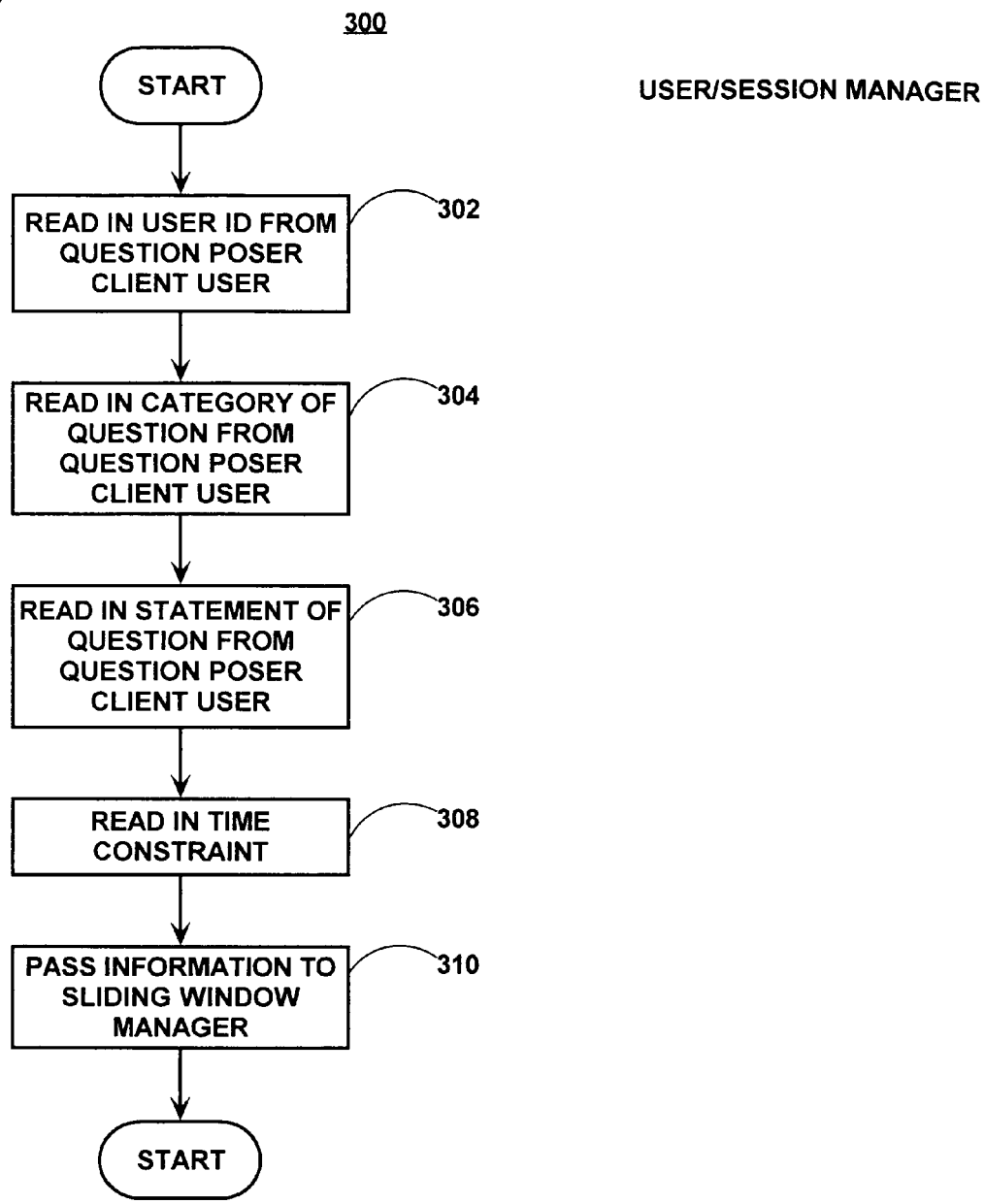
FIG. 3 is a flow diagram of a process performed by a User—Session manager according to an embodiment of the invention.

Flow Diagram for a Process Performed by a User-Session Manager According to an Embodiment of the Invention Referring to FIG. 3, a flow diagram 300 of a process performed by a User-Session manager 214C according to an embodiment of the invention is shown. In process block 302 a user ID is read in from a question poser client user. The question poser communication interface could serve up a login web page form for this purpose. The ID is associated with the user's question and used to associate answers received from experts with the user who posed the question.

In process block 304 a category of question specified by the question poser client user is read in. The category might be selected from a Hypertext Mark Up Language (HTML) select list.

In process block 306 a statement of the question is read in. The question could for example be entered into a text box of a HTML form. In process block 308 a time limit which could take the form of a deadline by which the question poser client user wants the posed question to be answered is read in.

In process block 310, the information read in the preceding process blocks 302, 304, 306, and 308 is passed to the sliding window manager.

Figure 4:
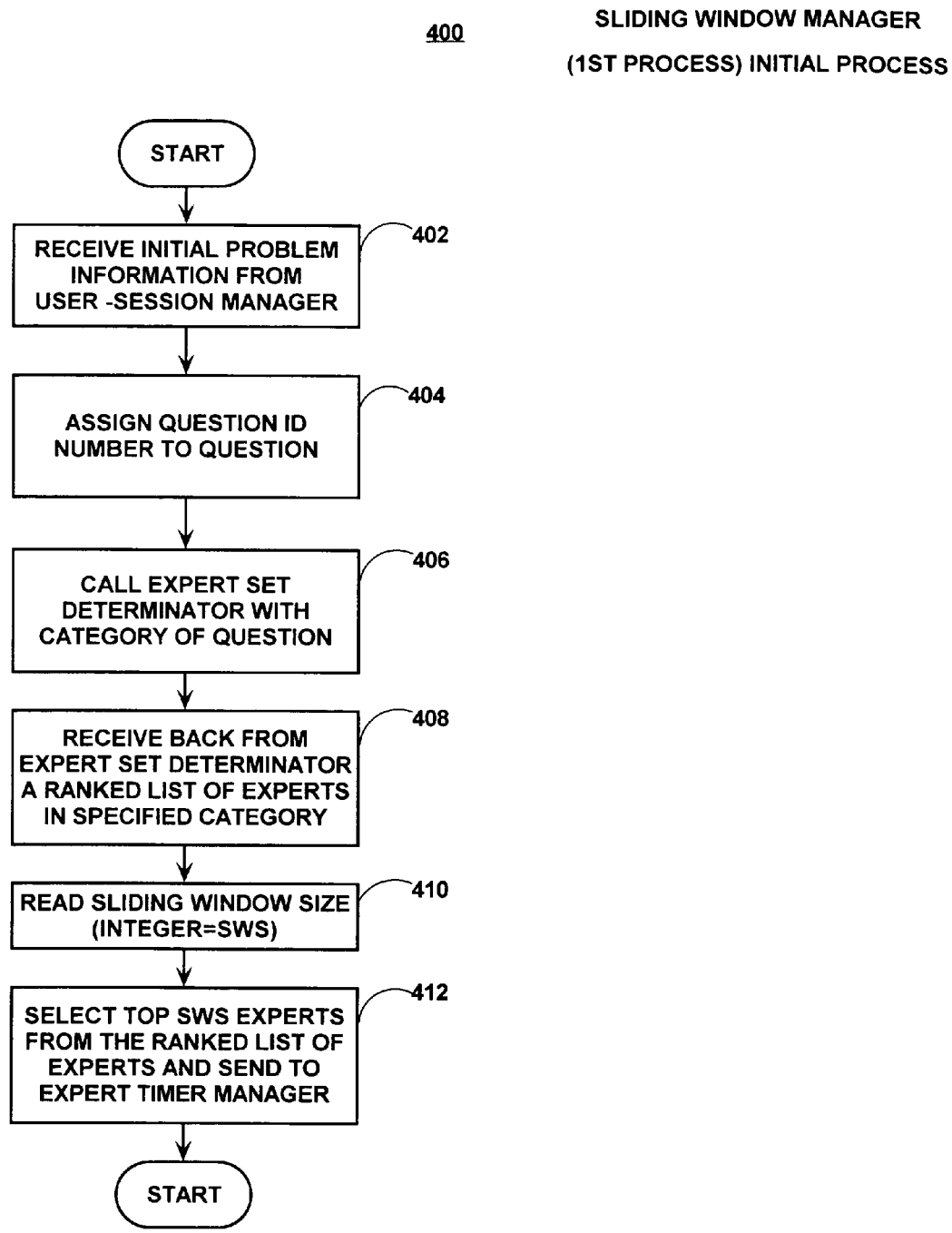
FIG. 4 is a flow diagram of a process performed by a sliding window manager according to an embodiment of the invention.

Flow Diagram of a Process Performed by a Sliding Window Manager According to an Embodiment of the Invention Referring to FIG. 4, a flow diagram 400 of a process performed by a sliding window manager 214D according to an embodiment of the invention is shown. In process block 402 initial problem information (question plus ancillary information) is received from the user/session manager 214C. Recall that, the information was forwarded by the latter in process block 310. In process block 404 a question ID number is assigned to the question. A record may be created in a database maintained by the sliding window manager (not shown) of the question. The record may comprise the question ID as a primary index and the information forwarded to the sliding window manager in process block 310 and received in process block 402. The question ID number can be also used as a parameter for identification purposes as information is passed between various program modules shown in FIG. 2. In process block 406 the expert set determinator 214E is called with the category of the question. In process block 408 a set of experts corresponding to the specified category, is received back from the expert set determinator. The set may include a ranking score associated with each expert and/or it may be sorted according to the ranking score. In the former case the schedule manager may sort the set in a process step (not shown). The ranking depends on the experts past performance in terms of quality and timeliness in supplying answers. The sorting is important because it insures that experts who give better answers in a more timely fashion will be the first experts to receive new questions. The set of experts received in process block 408 will also include contact information which may take the form of email addresses, or pager numbers.

In process block 410 an integer variable sliding window size (SWS) is read in from a memory associated with question management server application 110. The sliding window size corresponds to the number of experts which the question management application 214 initially seeks to receive answers from. The question's posers question is initially submitted to SWS number of experts. When experts drop out the sliding window manager 214D will select a new expert from the set received in process block 408 from the expert set determinator 214E. Alternatively the expert set determinator 214E could initially only send SWS experts and later it would be called as needed to supply successive expert names in the category. Rather than reading SWS from memory, SWS could also be a value specified by the question poser client user. Some reasonable constraint in view of available question management server 110 resources may be placed on the question poser client user's choice of SWS.

In process block 412 the top SWS experts are selected from the ranked list of experts and sent to the expert timer manager. In the case of object orient programming an expert timer manager object could be instantiated for each expert. The top SWS experts constitute the initial sliding window members.

Figure 5:
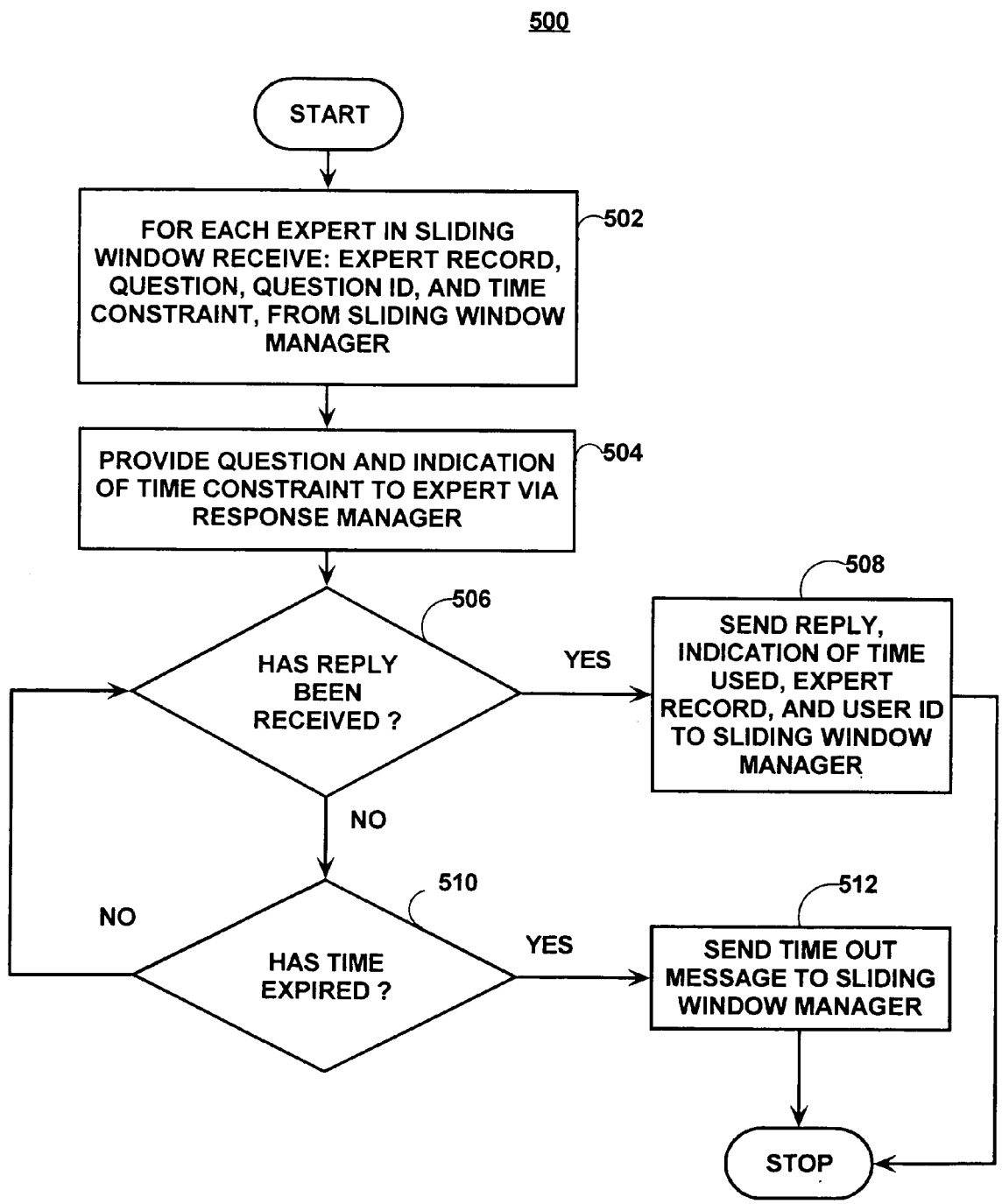
FIG. 5 is a flow diagram of a process performed by an expert timer manager according to an embodiment of the invention.

Flow Diagram of a Process Performed by an Expert Timer Manager According to an Embodiment of the Invention Referring to FIG. 5 a flow diagram 500 of a process performed by an expert timer manager 214H instance according to an embodiment of the invention is shown. In process block 502, for each expert in the sliding window an expert record which includes identification of, and contact information for the expert, the question, the question ID, and the time constraint (deadline) specified by the question poser are received from the sliding window manager. In process block 504 the question and an indication of the time constraint (e.g., deadline) are provided to the expert via the response manager 214I and the expert communication interface 214B. The delivery of the question to the plurality of experts could take a number of forms as alluded to earlier. A web page containing the question which the expert may access optionally by entering a password may be generated. Preferably, for more timely delivery the question or notification about the question could be sent via email or wireless device (e.g., text messaging pager 128) to each expert. If only notification of the question is sent via a wireless device, the entire question could also be sent via email or included in a web page which the expert may access.

The blocks which follow are involved in the timing function of the expert timer manager 214H. In process block 506, it is determined if a reply has been received from the expert. The reply may be an answer or a message indicating that the expert has explicitly declined to work on the question. If a reply has been received then the reply, an indication of the time used, and the question ID are sent back to the sliding window manager 214D.

If it is determined in process block 506, that an answer has not yet been received then the process continues with process block 510 in which it is determined if the time indicated in the time constraint has expired. If not, then the process loops back to process block 506. If on the other hand the time has expired than the process continues with process block 512 in which a time out message is sent back to the sliding window manager. The message would preferably include at least the question ID an identification of the expert.

Figure 6:
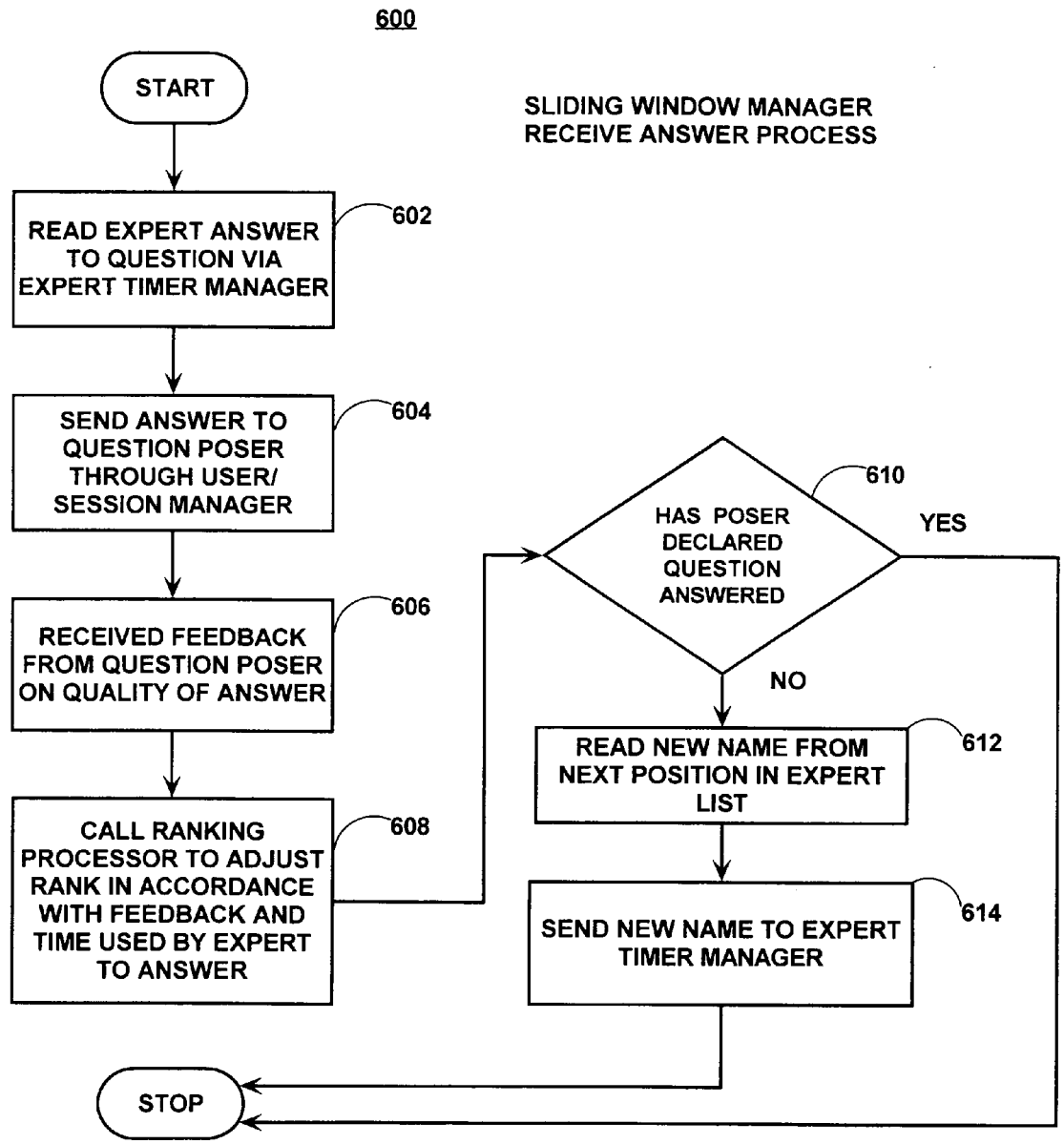
FIG. 6 is a flow diagram of a process performed by a sliding window manager in response to receiving an answer via an expert timer manager according to an embodiment of the invention.

Flow Diagram of a Process Performed by a Sliding Window Manager in Response to Receiving an Answer Via an Expert Timer Manager According to an Embodiment of the Invention Referring to FIG. 6, a flow diagram 600 of a process performed by a sliding window manager 214D in response to receiving an experts answer via an expert timer manager 214H is shown.

In process block 602 an experts answer to a question posed by a question poser client 202 user is read. In process block 604, the answer is sent to the question poser through the User—Session Manager 214C. The answer may be sent as an email message or may be formatted into a web page generated or updated by the question poser communication interface. The email may include the unique ID associated with the question.

In process block 606 feedback is received from the question poser on the quality of the answer. Note that the question poser provides feedback for each answer. The feedback may for example take the form of a numerical rating for one or more rating areas. The feedback may for example be provided in the form of a response to the e-mailed answer. The e-mailed answer may include instruction on how to format the feedback. For example it may specify that the feedback be included as one or more numbers in the range of 1 to 5 corresponding to specified rating areas, and that the numbers be listed on the first line of the response separated by commas. The question poser communication interface can include an email reader which identifies the received feedback email by the question ID in the subject, and parses the body of the email to extract the rating number sequence. In process block 608 the ranking processor is called to adjust the rank in accordance with the feedback and time used by the expert to answer the question.

The question poser may also declare the question answered as part of the feedback reply. For example, the question poser could include the string "ANSWERED" in the feedback email. In parsing the feedback email reply the string would be identified. If the question is declared answered, there is no need to send the question to new experts from the ranked list.

In process block 610 it is determined if the question poser has declared the question answered. If the question has been declared answered, then the process terminates. If not, then the process continues with process block 612 in which the next name in the ranked list of experts for the category is selected. In process block 614 the new name is sent to the expert timer manager which in turn will send the question to the new expert.

Figure 7:
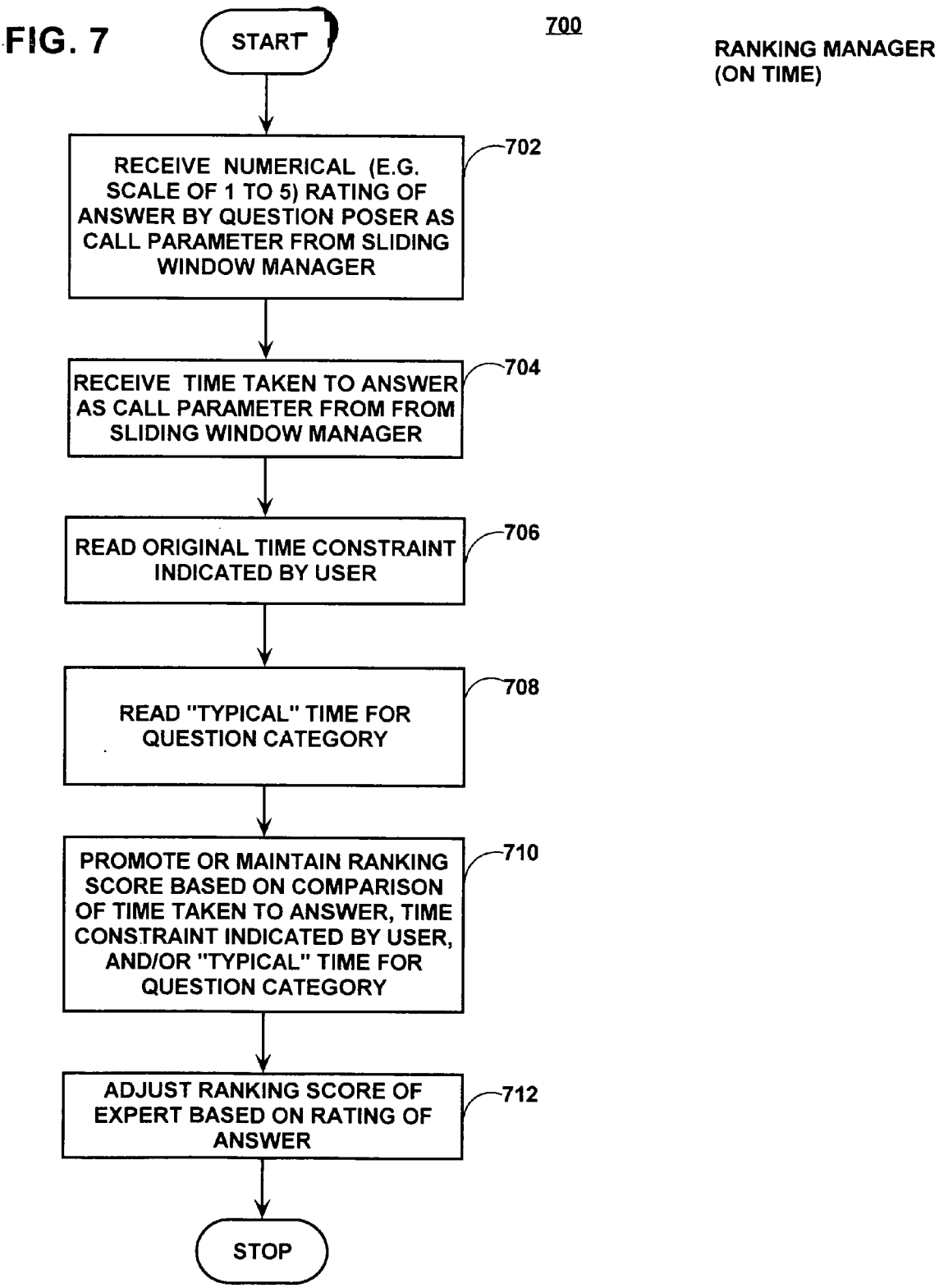
FIG. 7 is a flow diagram of a process performed by a ranking manager in the case that an answer is received within specified time limit according to an embodiment of the invention.

Flow Diagram of a Process Performed by a Ranking Manager in the Case that an Answer Is Received Within Specified Time Limit According to an Embodiment of the Invention In process block 608 of FIG. 6 the ranking manager was called to adjust the rank of an expert supplying an answer. Referring to FIG. 7 a flow diagram 700 of a process performed by a ranking manager 214G in the case that an answer is received within a time limit specified by a question poser. In process block 702 a set of numerical ratings of an answer in one or more areas (e.g., level of detail, perceived correctness, etc.) Is received from a sliding window manager 214D. In process block 704 the time taken to answer the question (which had been sent to the sliding window manager in process block 508) is received from the sliding window manager. In process block 706 the original time constraint indicated by the question poser client user is read. In process block 708 a "typical" time for questions in the category of the instant question is read. The typical time could for example take the form of a running average of the time taken to answer questions in each category which is maintained by the question management application 214. The average could be taken over a select set of answers for the category, such as the first five answers received for previous questions in the category.

In process block 710 the ranking score associated with the expert supplying the answer is either maintained or increased based on the values of the time taken to answer the question, the time constraint indicated by the user and/or the typical time for the relevant question category. For example, if the time taken to answer the question is less than a first preselected fraction (e.g., ⅓) of the time allowed by the question poser for answering the question, then the experts ranking score could be decreased. (exceeded) by a first preselected amount (e.g., 1). Also if the time taken to answer the question is less than a preselected fraction (e.g., ½) of the typical time for the question category, then the experts ranking score could be decreased by a second preselected amount (e.g., two). The ranking score is a measure of the timeliness and quality of experts answers which can take the form of a float or integer. As mentioned above, the ranking score is used to sort the experts in each category so that experts with lower-ranking score will be the first ones selected to whom to submit new questions.

In process block 712 the ranking score of the expert is adjusted either up or down based on the rating of the answer received as feedback from the question poser. For example the question poser could be requested to assign a number from one to five as the overall quality rating to the answer. The question poser could be instructed that the number correspond to qualitative assessments of the answer as follows: one=poor, two= fair; three=good; four=very good and five=excellent. In process block 712 a rating of three would then result in the experts ranking score being maintained, whereas other scores would result in the experts ranking score being adjusted up or down to a greater or lesser degree according to some preselected formula or algorithm. For example the ranking score could be adjusted based on the rating number according to the following formula:

$$NEWRS=OLDRS+SF*(RAT-3)$$

where,
NEWRS is the new ranking score,
OLDRS is the old ranking score,
SF is a preselected scale factor, and
RAT is the numerical rating from 1 to 5.

As a numerical example, the ranking score could be an integer variable which is initialized to zero. The scaling factor could be one. This is a simplest linear formula. Other formulas which adjust the ranking score in more complex ways based on a number of ranting areas could also be used.

Figure 8:
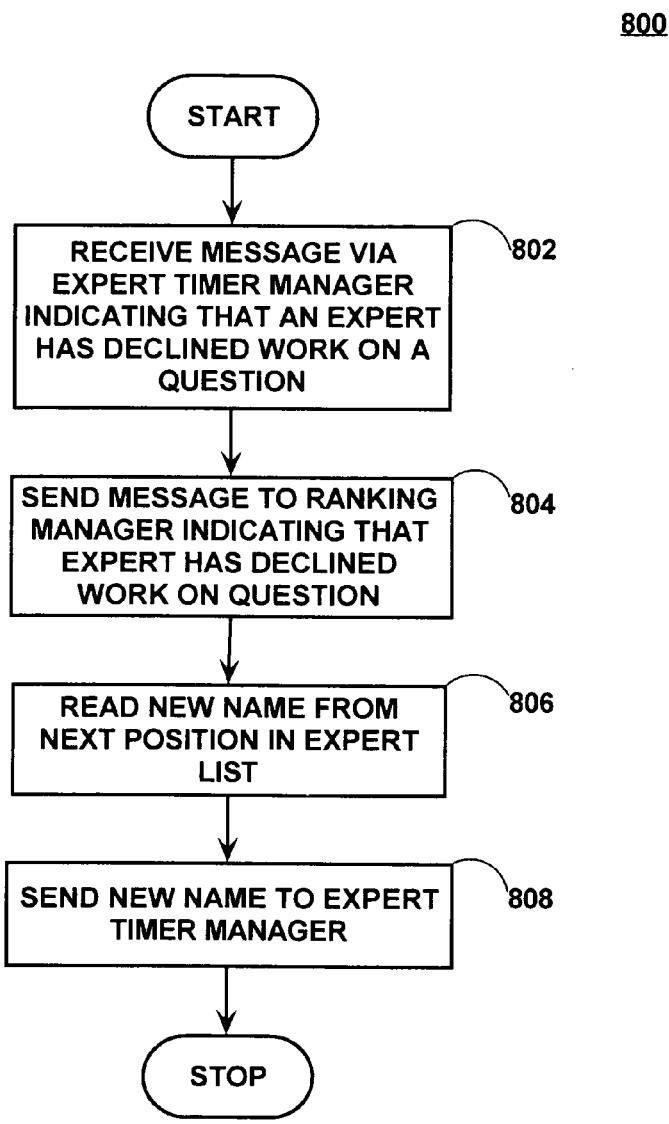
FIG. 8 is a flow diagram of a process performed by a sliding window manager in the case that an expert explicitly declines to answer a question according to an embodiment of the invention.

Flow Diagram of a Process Performed by a Sliding Window Manaaer in the Case That an Expert Explicitly Declines to Answer a Question According to an Embodiment of the Invention FIG. 8 shows a flow diagram 800 of a process performed by the sliding window manager 214D in the case that the reply by the expert sent by the expert timer manager 214H in process block 508 is a declination by the expert to answer the question. For example, an expert could decline by including the string "decline question" in a reply email. The body of the email could be extracted by the expert timer manager 214H as part of process step 508, and string "decline question" could be parsed by sliding window manager 214D. The expert could also decline by, for example, accessing a web page corresponding to the question by using a password provided in a pager message, and clicking a decline button.

In process block 802 a message is received via the expert timer manager indicating that an expert has declined to work on a question. In process block 804 notification is sent to the ranking manager 214G that the expert has declined to answer a question. In process block 806, a new expert from the next position in the ranked expert list for the particular category of the question is read. In process block 808 a new expert timer manager is instantiated with the name of the new expert selected from the ranking score sorted expert list. The expert timer manager will in turn submit the question to the new expert according to the process shown in FIG. 5.

Figure 9:
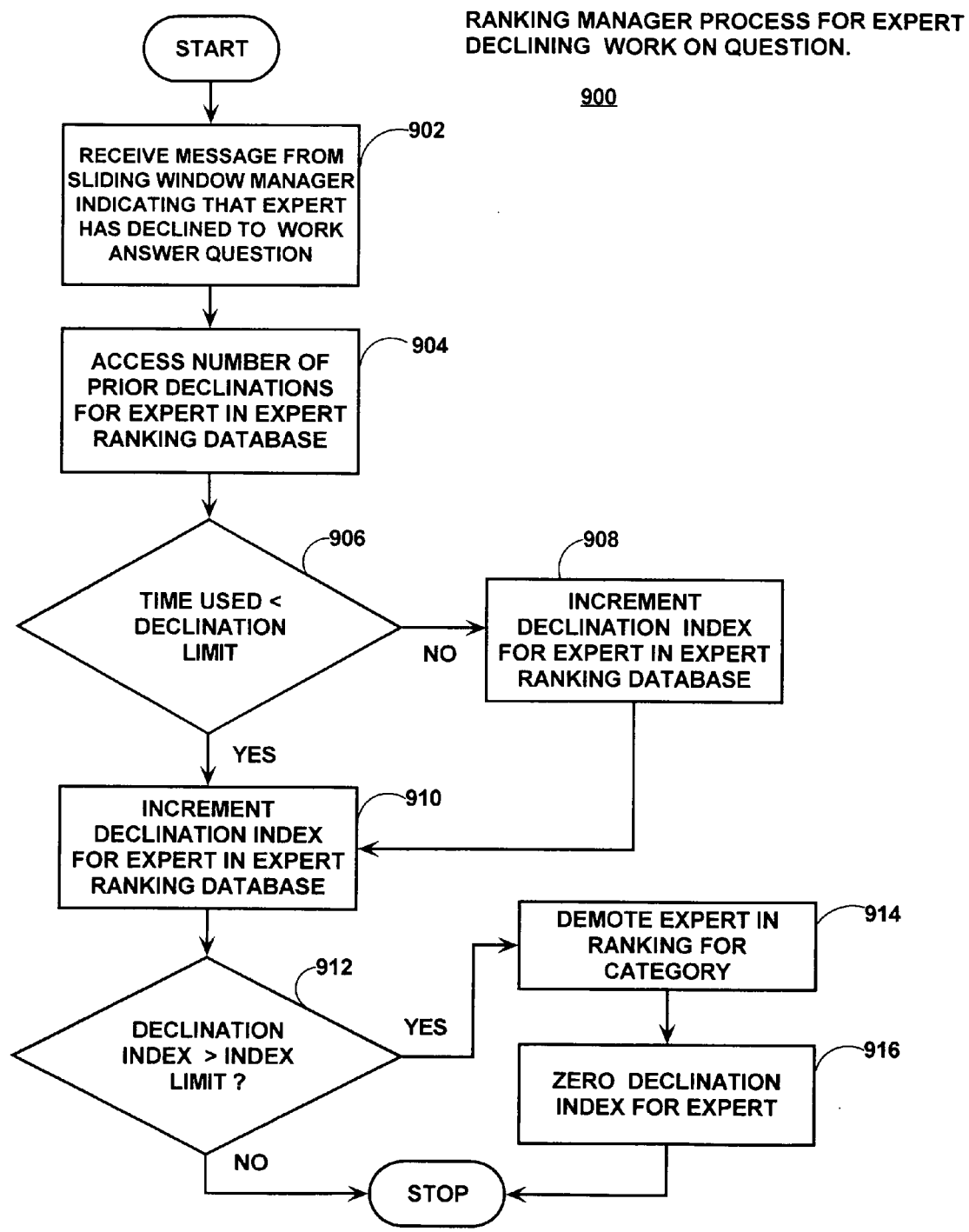
FIG. 9 is a flow diagram of a process performed by a ranking manager in response to an indication that an expert has declined to work on a question according to an embodiment of the invention.

Flow Diagram of a Process Performed by a Ranking Manager in Response to an Indication That an Expert Has Declined to Work on a Question According to an Embodiment of the Invention FIG. 9 shows a flow diagram 900 of a process performed by a ranking manager 214G in response to receiving a message sent in process block 804 by the sliding window manager 214D. According to the process shown in FIG. 9 an expert is allowed to decline a certain number of times before their ranking score is increased (worsened). If they decline is submitted within a short interval of receiving the question they will be allowed more declines before their score is worsened.

Referring to FIG. 9, in process block 902 a message is received from a sliding window manager 214 indicating that an expert has declined to answer a question. In process block 904 a previous number of declinations for the expert which are stored in the expert ranking database are accessed. Separate counts of declinations for a particular expert for each of a plurality of subject categories under which the expert is listed may be maintained. In process block 906 the time used by the expert (i.e., the interval between sending the question to the expert and receiving the decline from the expert) is compared to preselected declination limit. The declination limit value may be selected to give a reasonable time for submitting declines to questions. Preferably the declination limit is selected to give the expert a preselected small fraction of the interval granted by the question poser for answering the question. The declination limit could also be forwarded to the expert timer module 214H and so that a statement of the declination limit can be supplied to the expert along with the question. The expert will be penalized less severely if the declination is submitted within the declination limit. If it is determined in process block 906 that the time used exceeds the declination limit, then in process block 908 a declination index (e.g., a positive integer) associated with the expert in the expert ranking database is incremented, and the process continues with process block 910 in which the declination index is incremented again. If on the other hand the time used is less than the declination limit, then the process proceeds directly to process block 910, and the declination index is only incremented once. In process block 912, the declination index is compared to an index limit value. If the declination index exceeds the index limit value, then in process block 914 the experts ranking score is increased (worsened), and in process block 916 the declination index for the expert is zeroed. If the declination index does not exceed the index limit value then the process simply terminates. In the latter case the declination index will have been increased and the expert will have been brought closer to having their ranking score increased if they decline questions in the future.

A separate process (not shown) could be run to zero the declination indexes of all the experts every preselected interval, e.g., every month, thereby granting some allowance for declining questions.

Thus, experts are encouraged to limit their declination of questions, and to decline quickly when they do decline, so that the system can select another expert to submit question to and the new expert will have a reasonable amount time remaining before the deadline in which to answer the question.

Figure 10:
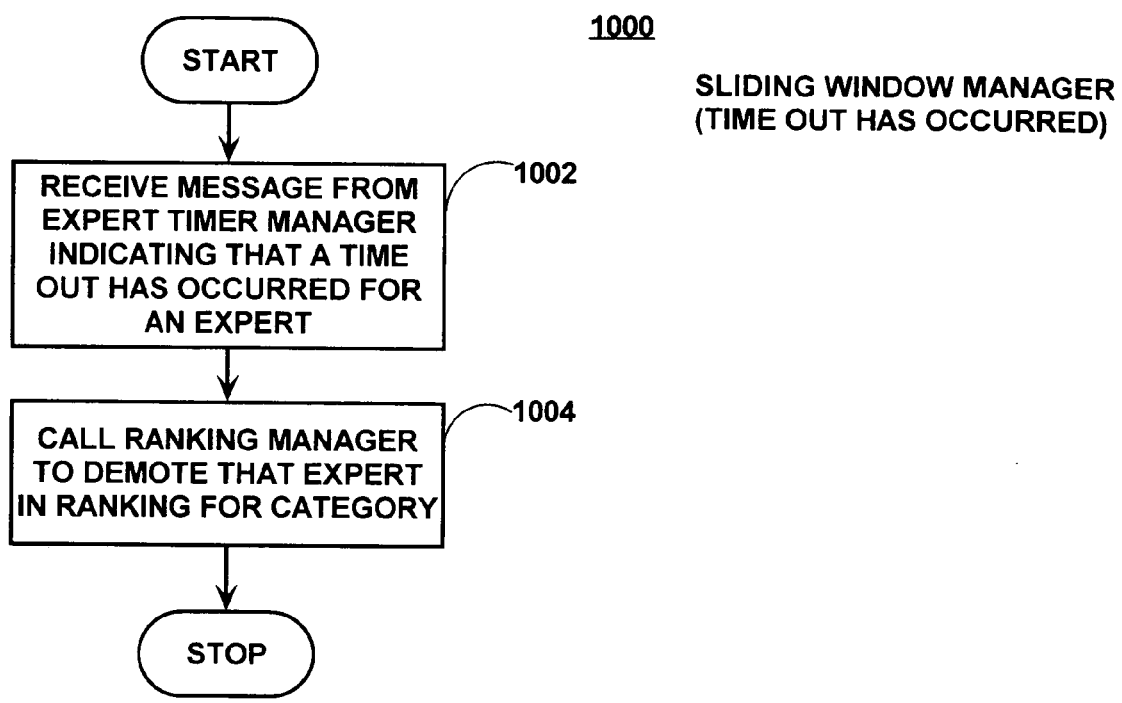
FIG. 10 is a flow diagram of a process performed by a sliding window manager when an expert exceeds the time allowed for answering a question according to an embodiment of the invention.

Flow Diagrams of a Process Performed When an Expert Exceeds the Time Allowed for Answering the Question According to an Embodiment of the Invention Referring to FIG. 10, a flow diagram 1000 of a process performed by a sliding window manager in response to receiving a receiving a message, generated in process block 512, from an expert timer manager 214H indicating that an expert has timed out without answering a question.

In process block 1002 a message is received from the expert timer manager indicating that a time out has occurred for an expert. The expert is identified in the message. In process block 1004 the ranking manager is called to demote that expert in the ranking for the particular question.

Figure 11:
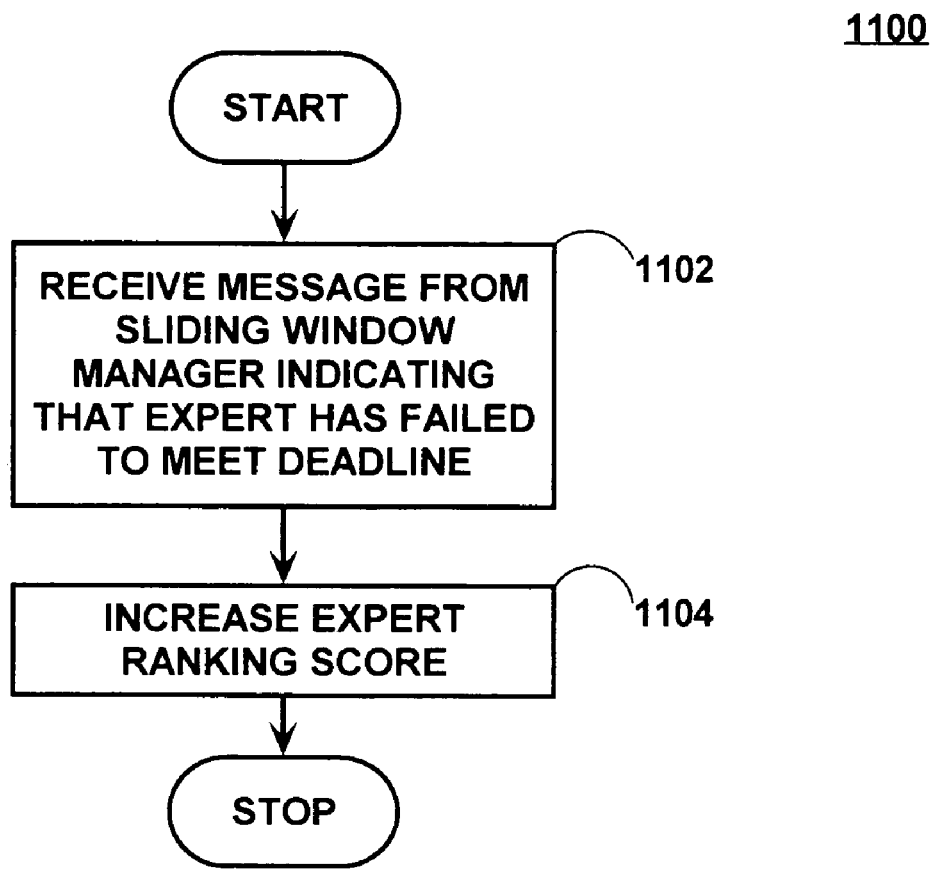
FIG. 11 is a flow diagram of a process performed by a ranking manager when an expert exceeds the time allowed for answering a question according to an embodiment of the invention.

Referring to FIG. 11 a process performed by a ranking manager 214G in response to receiving a message, generated in process block 1004, from a sliding window manager 214D indicating that an expert has timed out.

In process block 1102 the ranking manager 214G is called by the sliding window manger 214D to demote an expert due to the expert having timed out. In process block 1104 the experts ranking score is increased by a preselected amount (e.g., 3). A higher penalty may be in order for experts that timeouts without response relative to those that explicitly decline.

Figure 12:
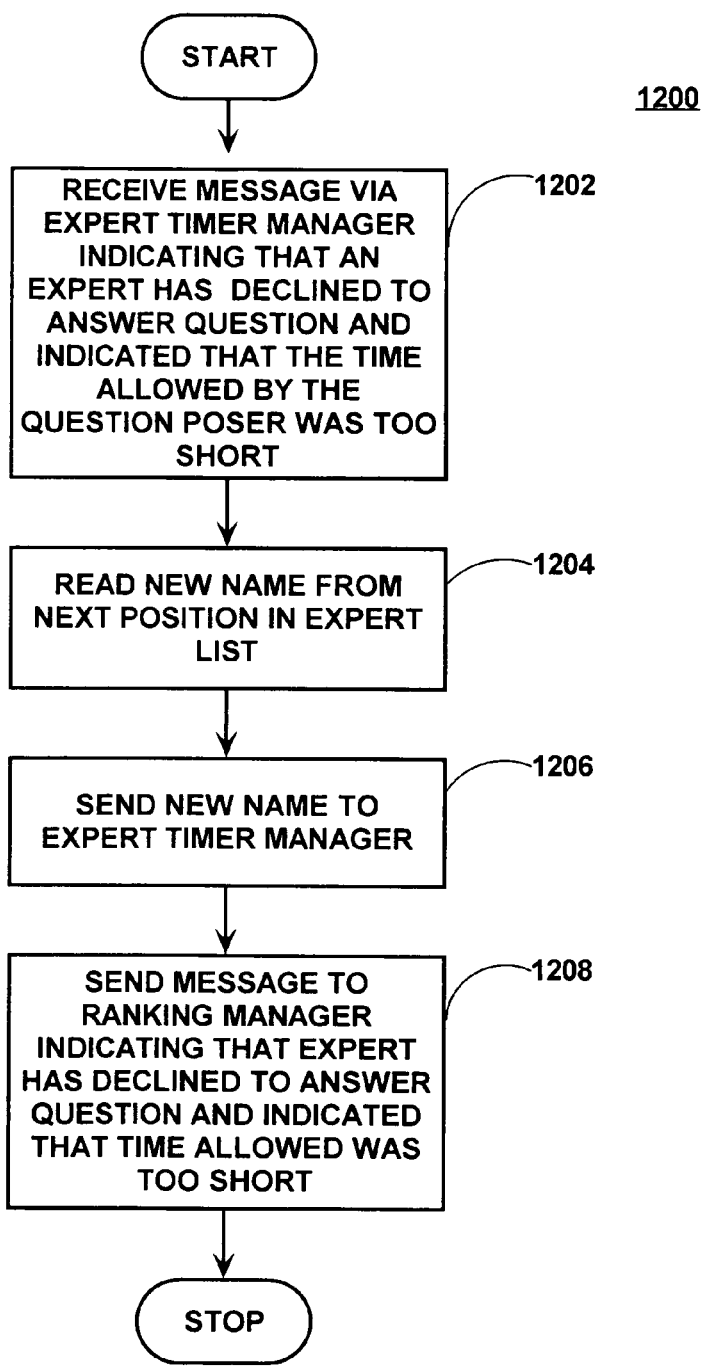
FIG. 12 is a flow diagram of a process performed by a sliding window manager in response to receiving an indication from an expert that the time allowed for answering a question is too short according to an embodiment of the invention.
Figure 13:
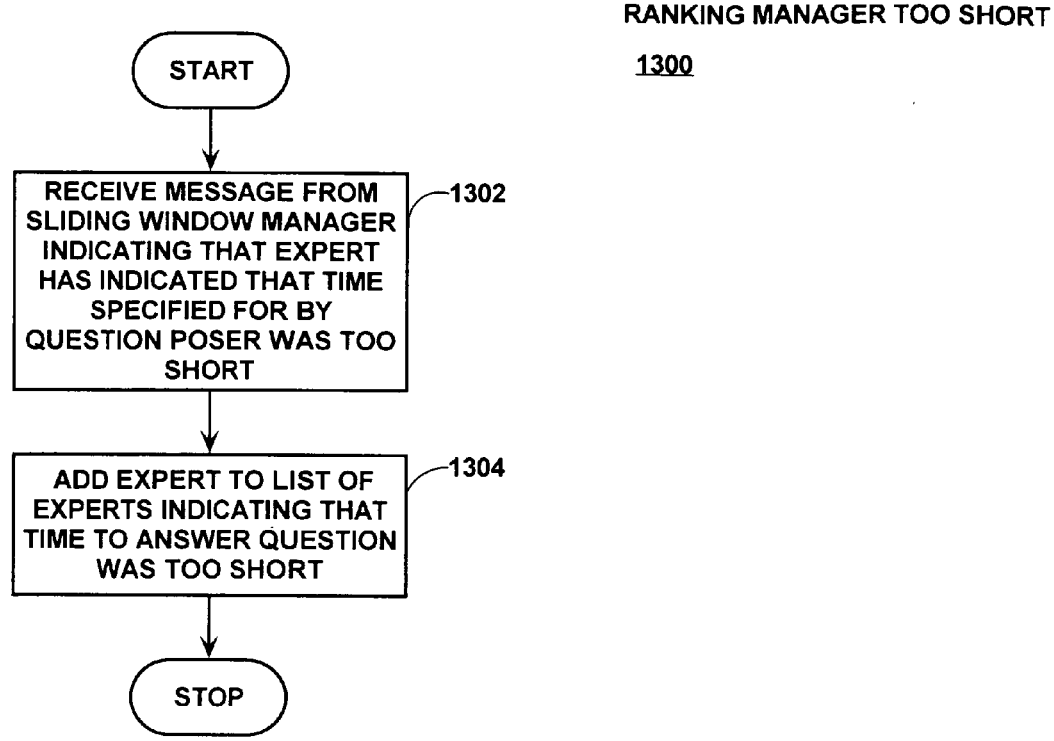
FIG. 13 is a flow diagram of a first process performed by a ranking manager related to indications by experts that the time to answer a question is too short according to an embodiment of the invention.
Figure 14:
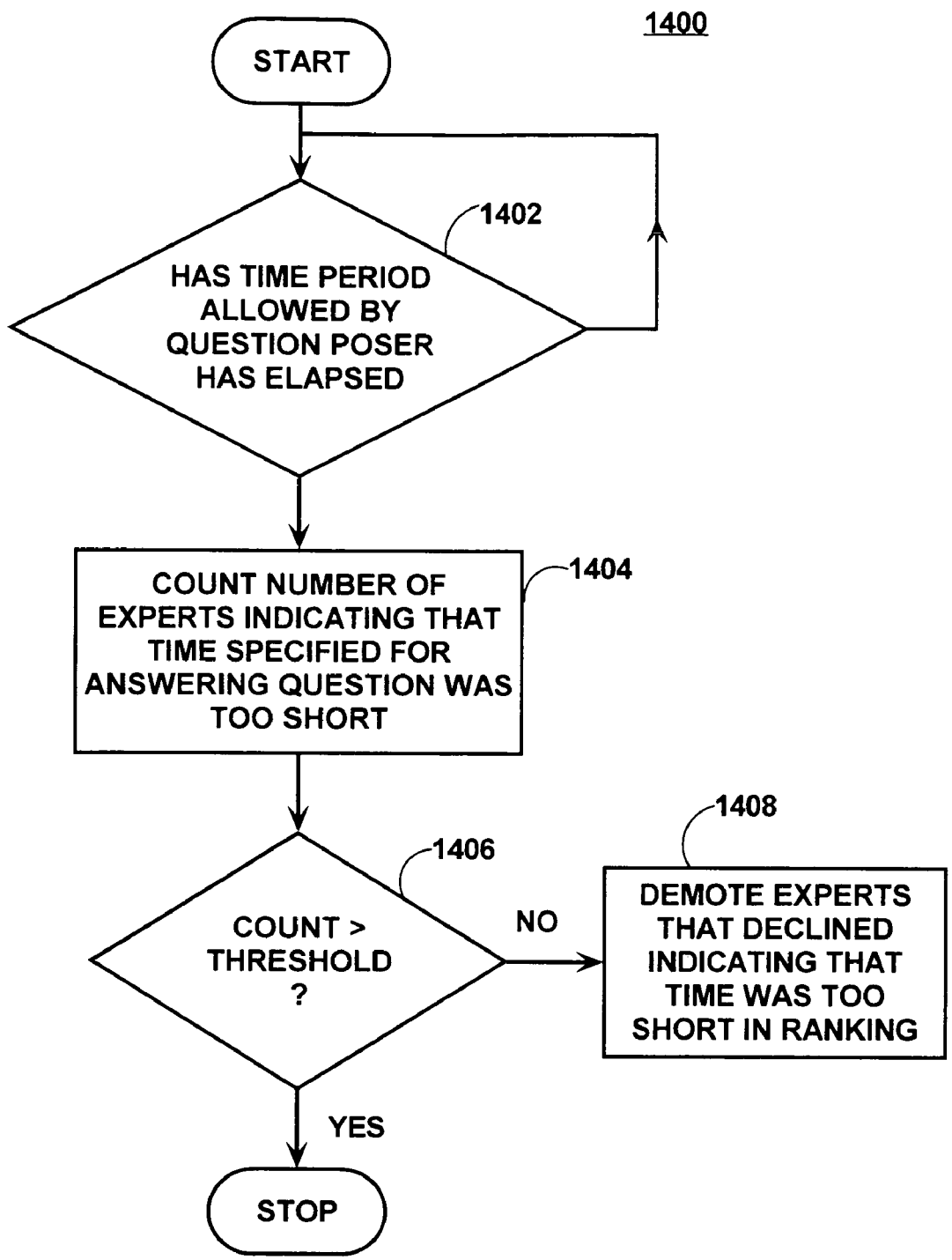
FIG. 14 is a flow diagram of a second process performed by a ranking manager related to indications by experts that the time to answer a question is too short according to an embodiment of the invention.

Flow Diagrams of Processes Performed When an Experts Indicate That the Time Allowed for Answer a Question Was Too Short According to an Embodiment of the Invention FIGS. 12–14 relate to handling an indication by one or more experts that the time specified by a question poser is too short. An email transmitting a question may include instruction directing experts to reply with the string "TOO SHORT" in the body of the reply if they believe the time given to answer the question is in fact too short. The sliding window manager 214D could upon parsing the answer detect the "too short" string and start the process shown in FIG. 13. Alternatively, a web page that an expert accesses, possibly after receiving a wireless device message alerting the expert to the question, could provide a hyperlink for indicating that the time provided is too short. The hyperlink could point to a CGI script that serves as an interface to the question management application 214.

FIG. 12 depicts a flow diagram 1200 of a process performed by a sliding window manger 214D in the case that an expert indicates that the time provided to answer a question is too short. In process block 1202 a message is received via an expert timer manager indicating that an expert has declined to answer a question and indicated that the time allowed by the question poser was too short. In process block 1204 a new name is read from the next position in the rank sorted expert list for the subject category of the question. In process block 1206 the new name is sent to the expert timer manager. In process block 1208 a message is sent to the ranking manager indicating that the expert has declined to answer the question and indicated that time allowed for answering the question was too short. Note that although one expert has indicated that the time allowed was too short, a new name is still drawn from the list so that the question can be submitted to another expert in place of the expert that declined.

FIG. 13 shows a flow diagram 1300 of a follow-on process performed by a ranking manager 214G to the process depicted in FIG. 12. In process block 1302 a message is received by the sliding window manager that an expert has indicated that the time specified by a question poser to answer a question is too short. In process block 1304, the expert is added to a list of experts that indicated that the time to answer the question was too short. The list could be maintained in a database record identified by question ID.

FIG. 14 shows a flow diagram 1400 of a further process performed by a ranking manager 214G related to indications by one or more experts that the time provided to answer a question was too short. In process block 1402, it is determined if the time, allowed by the question poser for answering the question has elapsed. If not the process loops back and checks again. If the time for answering the question has elapsed, then in process block 1404 a count of the number of experts that indicated that the time specified by the question poser for answering the question was too short is taken. In process block 1406 it is determined if the count exceeds a predetermined threshold value, for example three. If the count does not exceed the threshold, then in process block 1408 the experts that declined to answer the question and indicated that the time to answer was too short are demoted, that is their ranking score is increased. If the count does exceed the threshold then the process terminates without adversely altering the ranking score of the experts that indicated that the time was too short.

Discussion of Hardware and Software Implementation Options

The present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

What is claimed is:

1. A system for managing questions submitted by a person with a question and answered by one or more experts comprising:
   a question management server;
   a question poser communication interface;
   an expert communication interface;
   an expert ranking database for maintaining a list of experts in one or more categories along with an item of information indicative of timeliness of an expert in providing answers and quality of answers provided by an expert;
   an expert set determinator for extracting a set of experts in a particular category from the expert ranking database based on the item of information indicative of timeliness of each expert in providing answers and quality of answers provided by each expert; and
   a sliding window manager for extracting a contiguous subset of the set of experts to whom to send a question received from a question poser.

2. A system according to claim 1, further comprising:
   a user-session manager for receiving feedback from the question poser; and
   a ranking manager for adjusting the item of information in accordance with the feedback received from the question poser.

3. A system according to claim 1, further comprising:
   an expert timer manager for timing the time taken by an expert to answer a question; and
   a ranking manager for adjusting the item of information in accordance with the time taken by the expert to answer the question.

4. A system according to claim 1, further comprising:
   a user-session manager for receiving feedback from the question poser;
   an expert timer manager for timing the time taken by an expert to answer a question; and
   a ranking manager for adjusting the item of information in accordance with the time taken by the expert to answer the question and the feedback received from the question poser.

5. A method on a server for managing questions received via a network from a plurality of client systems comprising steps of:
   receiving a question from a question poser using a client system;
   extracting a set of experts with associated ranking scores, wherein ranking scores are based on timeliness of each expert in providing answers and the quality of the answers provided by each expert;
   selecting a subset of the set of experts based on the associated ranking scores; and
   providing the question to the subset of experts.

6. A method according to claim 5, further comprising steps of:
   receiving an answers from an expert; and
   sending the answer to the question poser.

7. A method according to claim 6, further comprising steps of:
   timing the time taken by the expert to answer the question; and
   adjusting a ranking score associated with the expert on the basis of the time taken.

8. A method according to claim 5, further comprising steps of:
   receiving a feedback response from the question poser on the quality of an answer provided by the expert; and
   adjusting a ranking score associated with the expert on the basis of the feedback response.

9. A method according to claim 6, comprising a step of:
   timing the time taken by the expert to answer the question;
   reading a typical time for other experts to answer questions in a subject category; and
   adjusting a ranking score on the basis of the time taken by the expert to answer the question, and the time for other experts to answer questions in the subject category.

10. A method according to claim 5, comprising steps of:
    reading a time limit;
    starting a timer;
    waiting until the timer reaches the time limit; and
    adjusting a ranking score associated with the expert on the basis of the timer having reached the time limit.

11. The method according to claim 10 wherein the step of reading a time limit comprises a substep of:
    receiving a time constraint from the question poser.

12. A method according to claim 5, comprising steps of:
    receiving an explicit declination to answer the question from an expert; and
    adjusting a ranking score associated with the expert in response to receiving the explicit declination.

13. A method according to claim 5, comprising steps of:
    receiving an explicit declination to answer the question from an expert;
    performing a comparison of a time used by the expert to submit the explicit declination to a preselected declination limit time; and
    adjusting a ranking score associated with the expert In accordance with an outcome of the comparison.

14. A method according to claim 5, comprising steps of:
    sending an indication of a time limit for answering the question to an expert; and
    receiving a message from the expert indicating that the time limit is too short.

15. A method according to claim 14, further comprising steps of:
- storing the name of the expert in a list of experts that indicated that the time limit was too short;
- waiting until a time period has elapsed;
- obtaining a count of a number experts in the list;
- performing a comparison of the count to a preselected threshold; and
- adjusting a ranking score of the expert in accordance with an outcome of the comparison.

16. A method for operating an expert answer web site comprising steps of:
- receiving a question from a question poser;
- selecting a set of experts on the basis of timeliness of each expert in providing answers and the quality of the answers provided by each expert; and
- notifying the set of experts of the question.

17. The method according to claim 16, wherein the step of notifying the set of experts comprises a substep of:
- e-mailing the question to the set of experts.

18. The method according to claim 16, wherein the step of notifying the set of experts comprises a substep of:
- sending a wireless device messages to the set of experts.

19. The method according to claim 16, wherein the step of notifying the set of experts comprises a substep of:
- generating and sending a web page including the question.

20. A computer readable medium containing programming instructions for managing a question answer system comprising programming instructions for:
- receiving a question from a question poser;
- extracting a set of experts with associated ranking scores, wherein ranking scores are based on timeliness of each expert in providing answers and the quality of the answers provided by each expert;
- selecting a subset of the set of experts based on the associated ranking scores; and
- providing the question to the subset of experts.

21. A computer readable medium according to claim 20, further comprising programming instructions for:
- receiving an answers from an expert; and
- sending the answer to the question poser.

22. A computer readable medium according to claim 21, further comprising programming instructions for:
- timing the time taken by the expert to answer the question; and
- adjusting a ranking score associated with the expert on the basis of the time taken.

23. A computer readable medium according to claim 21, comprising programming instructions for:
- timing the time taken by the expert to answer the question;
- reading a typical time for other experts to answer questions in a subject category; and
- adjusting a ranking score on the basis of the time taken by the expert to answer the question, and the time for other experts to answer questions in the subject category.

24. A computer readable medium according to claim 20, further comprising programming instruction for:
- receiving a feedback response from the question poser on the quality of an answer provided by the expert; and
- adjusting a ranking score associated with the expert on the basis of the feedback response.

25. A computer readable medium according to claim 20, comprising programming instructions for:
- reading a time limit;
- starting a timer;
- waiting until the timer reaches the time limit;
- adjusting a ranking score associated with the expert on the basis of the timer having reached the time limit.

26. The computer readable medium according to claim 25, wherein the programming instructions for reading a time limit comprises programming instructions for:
- receiving a time constraint from the question poser.

27. A computer readable medium according to claim 20, comprising programming instructions for:
- receiving an explicit declination to answer the question from an expert; and
- adjusting a ranking score associated with the expert in response to receiving the explicit declination.

28. A computer readable medium according to claim 20, comprising programming instructions for:
- receiving an explicit declination to answer the question from an expert;
- performing a comparison of a time used by the expert to submit the explicit declination to a preselected declination limit time; and
- adjusting a ranking score associated with the expert in accordance with an outcome of the comparison.

29. A computer readable medium according to claim 20, comprising programming instructions for:
- sending an indication of a time limit for answering the question to an expert; and
- receiving a message from the expert indicating that the time limit is too short.

30. A computer readable medium according to claim 29, further comprising programming instructions for:
- storing the name of the expert in a list of experts that Indicated that the time limit was too short;
- waiting until a time period has elapsed;
- obtaining a count of a number experts in the list;
- performing a comparison of the count to a preselected threshold; and
- adjusting a ranking score of the expert in accordance with an outcome of the comparison.

31. A computer readable medium for operating an expert answer web site comprising programming instructions for:
- receiving a question from a question poser;
- selecting a set of experts on the basis of timeliness of each expert in providing answers and the quality of the answers provided by each expert; and
- notifying the set of experts of the question.

32. The computer readable medium according to claim 31, wherein the programming instructions for notifying the set of experts comprises a programming instructions for:
- e-mailing the question to the set of experts.

33. The computer readable medium according to claim 31, wherein the programming instructions for notifying the set of experts comprises programming instructions for:
- sending a wireless device messages to the set of experts.

34. The computer readable medium according to claim 31, wherein the programming instructions for notifying the set of experts comprises a programming instructions for:
- generating and sending a web page including the question.

* * * * *